United States Patent [19]

Berger

[11] Patent Number: 5,283,475
[45] Date of Patent: Feb. 1, 1994

[54] TELEVISION VIEWING CONTROL UNIT

[76] Inventor: Jeffrey C. Berger, 2509 37th St., Des Moines, Iowa 50310

[21] Appl. No.: 808,378
[22] Filed: Dec. 16, 1991
[51] Int. Cl.⁵ .................. G07F 15/12; H01H 43/00; H01H 47/00; H01H 7/00
[52] U.S. Cl. .................. 307/141.4; 307/141; 307/141.8; 307/125
[58] Field of Search .................. 307/141.4, 141, 140, 307/139, 125, 141.8, 130, 131; 358/190

[56] References Cited

U.S. PATENT DOCUMENTS

| | | | |
|---|---|---|---|
| 4,246,495 | 1/1981 | Pressman | 307/141 |
| 4,484,220 | 11/1984 | Beetner | 358/140 |
| 4,588,901 | 5/1986 | Maclay et al. | 307/141 |
| 4,712,019 | 12/1987 | Nilssen | 307/141 |
| 5,125,492 | 6/1992 | Treleaven et al. | 194/241 |

Primary Examiner—Howard L. Williams
Assistant Examiner—Aditya Krishnan
Attorney, Agent, or Firm—S. Michael Bender

[57] ABSTRACT

A lockable control box for a television is designed to have the television plug attached to a timer. A programmable control panel is used to regulate the hours the television is able to be turned on, and the control box comes equipped with three specially designed security features. The first of these is a plug lock which prevents electrical plugs from being disconnected from the control unit. Secondly, a lockable door is provided so as to prevent the unit from being reprogrammed except by a person having an associated key. Lastly, a circuit breaker is provided which is designed to be tripped if the unit is unplugged from the wall. These three security features prevent children from tampering with the television set.

1 Claim, 6 Drawing Sheets

TELEVISION VIEWING CONTROL UNIT

BACKGROUND OF THE INVENTION

1. Field of the Invention

The present invention relates to appliance locks and more particularly pertains to a lockable control box utilizable with a television or vcr.

2. Description of the Prior Art

The use of timer controls for televisions and similar appliances is known in the prior art. For example, U.S. Pat. No. 3,833,779, which issued to L. Leone on Sep. 3, 1974, discloses a television timer which is used to regulate television viewing time. A timer and an electrical receptacle controlled thereby are positioned within a container having a top which can be locked in a closed position to prevent access to the interior of the container. An electrical cord extends through an opening in the container and is adapted for connection to a source of electrical energy to provide power to the electrical receptacle as controlled by the timer. As such, the timer cannot be disconnected without interrupting power to the television set, thereby to regulate the amount of television viewing time in a selected manner.

Similarly, U.S. Pat. No. 4,588,901, which issued to Maclay et al. on May 13, 1986, discloses a further timer control for television which is designed to regulate the maximum time a television set can be operated. The device is manually set by use of a key which is operable to set a switch for a predetermined time period. The device interrupts the power circuit to the television when the predetermined time period expires.

As can be appreciated, both of these television timer controls are functional for their intended purposes. By the same token, each device utilizes a key to facilitate a locking or programming of the associated unit, and both units are designed to direct electrical power to the television in a noninterruptable manner. While both of these units are apparently operable for their intended purposes, neither have met with commercial success and apparently, additional versatility whereby an electrical plug might be secured in position without limiting access to a programming function might be desirable in the eyes of the consuming public. In this respect, the present invention substantially fulfills this need.

SUMMARY OF THE INVENTION

In view of the foregoing disadvantages inherent in the known types of television timer controls now present in the prior art, the present invention provides an improved television control unit wherein the same can be used to selectively prevent access to either an electrical plug or a programming keyboard, or both. As such, the general purpose of the present invention, which will be described subsequently in greater detail, is to provide a new and improved television viewing control unit which has all the advantages of the prior art television control units and none of the disadvantages.

To attain this, the present invention essentially comprises a lockable control box for a television and is designed to have the television plug attached to a timer. A programmable control panel is used to regulate the hours the television is able to be turned on, and the control box comes equipped with three specially designed security features. The first of these is a plug lock which prevents electrical plugs from being disconnected from the control unit. Secondly, a lockable door is provided so as to prevent the unit from being reprogrammed except by a person having an associated key. Lastly, a circuit breaker is provided which is designed to be tripped if the unit is unplugged from the wall. These three security features prevent children from tampering with the television set.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved television viewing control unit which has all the advantages of the prior art television viewing control units and none of the disadvantages.

It is another object of the present invention to provide a new and improved television viewing control unit which may be easily and efficiently manufactured and marketed.

It is a further object of the present invention to provide a new and improved television viewing control unit which is of a durable and reliable construction.

An even further object of the present invention is to provide a new and improved television viewing control unit which is susceptible of a low cost of manufacture with regard to both materials and labor, and which accordingly is then susceptible of low prices of sale to the consuming public, thereby making such television viewing control units economically available to the buying public.

Still yet another object of the present invention is to provide a new and improved television viewing control unit which provides in the apparatuses and methods of the prior art some of the advantages thereof, while simultaneously overcoming some of the disadvantages normally associated therewith.

Still another object of the present invention is to provide a new and improved television viewing control unit which is designed to prevent electrical plugs from being disconnected therefrom, which is also provided with a lockable door to prevent the unit from being reprogrammed, and which is provided with a circuit breaker reset button that trips if the unit is unplugged from an electrical power source.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWING

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
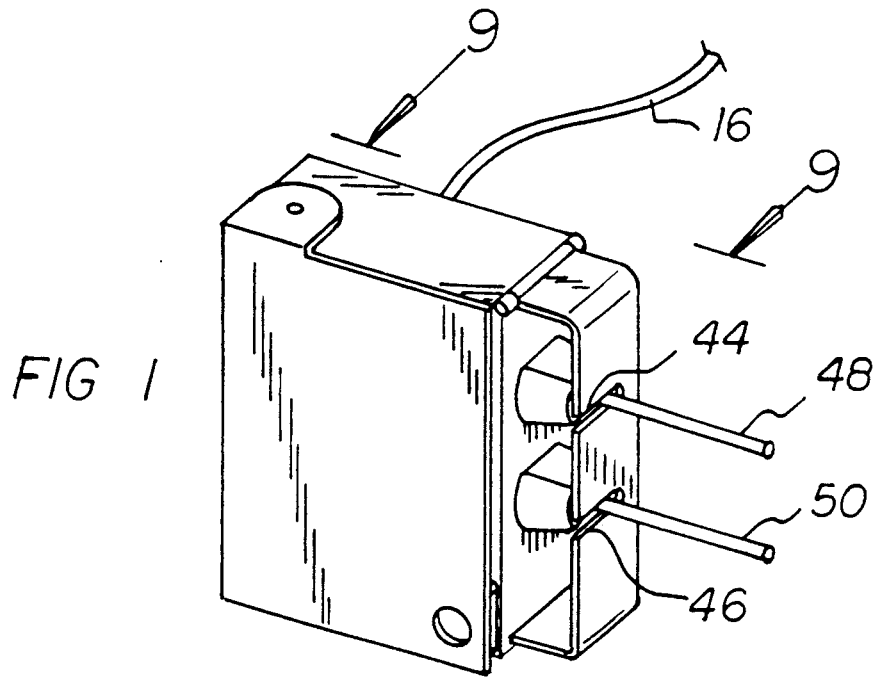
FIG. 1 is a perspective view of the television viewing control unit comprising the present invention.

With reference now to the drawings, and in particular to FIGS. 1-10 thereof, a new and improved television viewing control unit embodying the principles and concepts of the present invention and generally designated by the reference numeral 10 will be described.

More particularly, it will be noted that the television viewing control unit 10 essentially consists of a housing 12 having an integrally mounted key pad 14 which facilitates programming of an associated television or VCR. A conventional power supply cord 16 is directed to the housing 12, and electrical receptacles 18, 20 are mounted on a side of the housing to facilitate the delivery of power to associated appliances, such as televisions, VCR's, etc. The key pad 14 includes a liquid crystal display (LCD) 22 and a circuit reset button 24.

Figure 2:
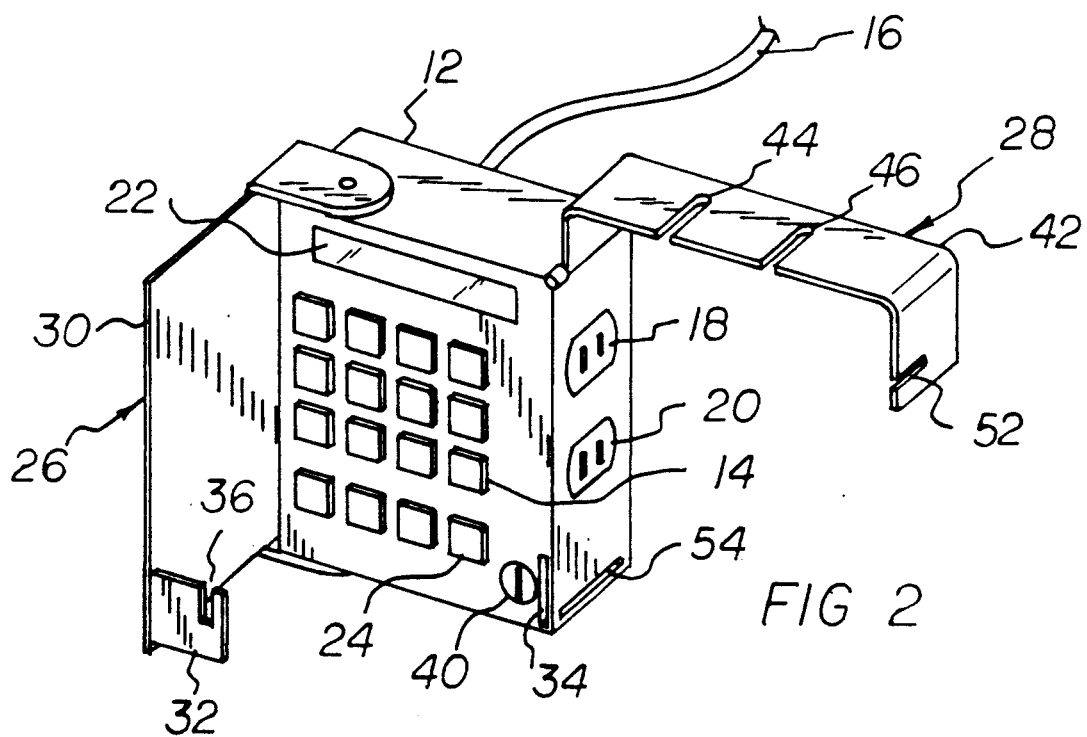
FIG. 2 is a perspective view of the invention showing the same in an opened position.
Figure 3:
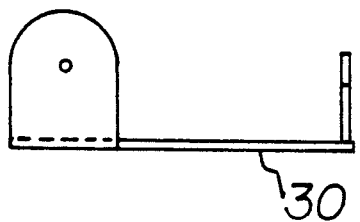
FIG. 3 is a top plan view of the lockable key pad door forming a part of the present invention.
Figure 4:
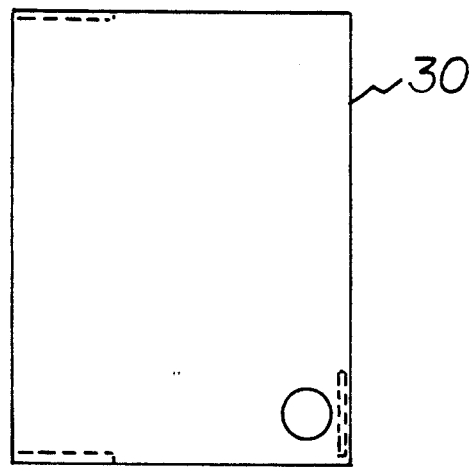
FIG. 4 is a front elevation view of the door.
Figure 5:
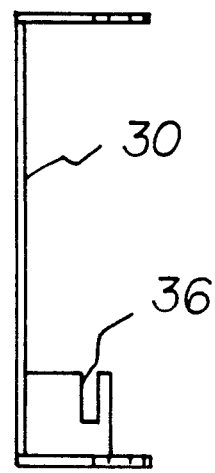
FIG. 5 is a side elevation view of the door.
Figure 6:
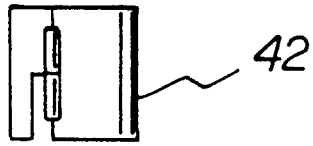
FIG. 6 is a top plan view of the electrical plug lock forming a part of the present invention.
Figure 7:
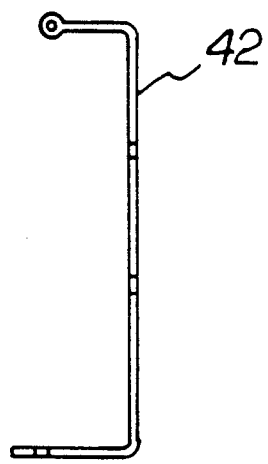
FIG. 7 is a side elevation view of the plug lock.
Figure 8:
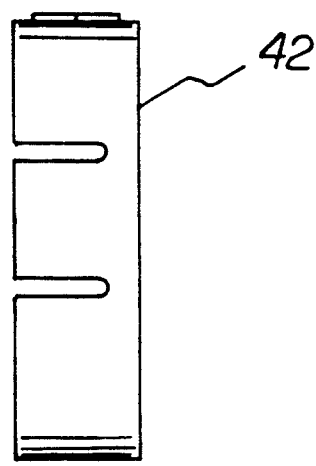
FIG. 8 is a front elevation view of the plug lock.
Figure 9:
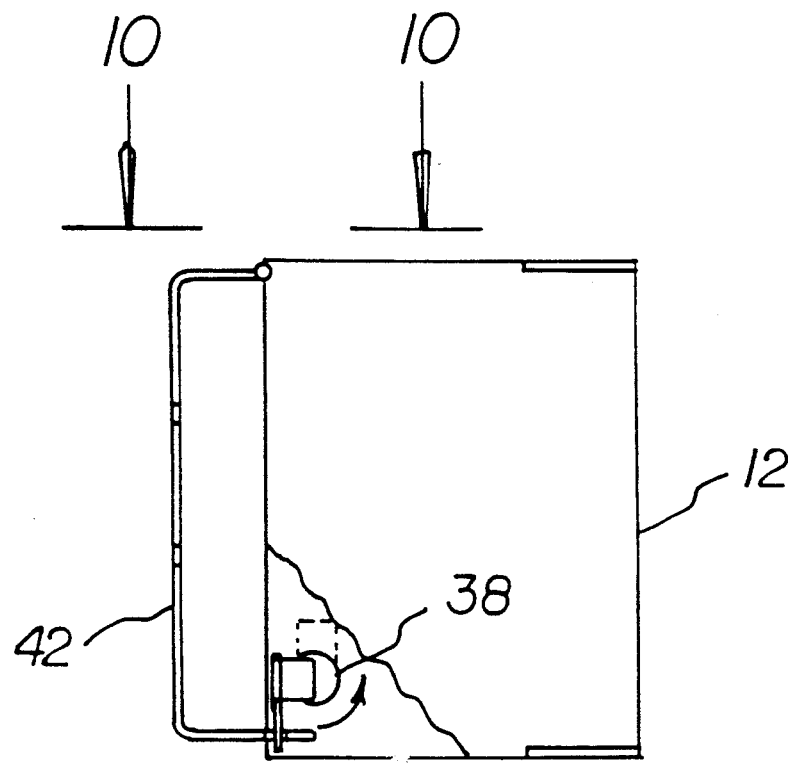
FIG. 9 is a rear elevation view of the invention.
Figure 10:
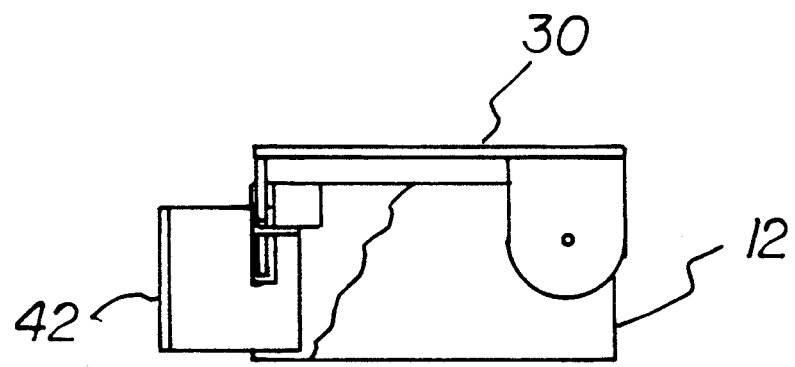
FIG. 10 is a top plan view of the invention.

Two protective cover assemblies 26, 28 are pivotally attached to the housing 12. In this regard, the assembly 26 consists of a pivotally attached door 30 which is lockably positionable over the key pad 14 to prevent access thereto. A locking arm 32 is attached to a bottom corner of the door 30 and is positionable within a slot 34 when the door is pivoted over the key pad 14. As best shown in FIGS. 2 and 9, a slot 36 formed in the locking arm 32 is designed to receive a locking member 38 which may be rotated into the slot through the use of a key inserted into the key slot 40. When the locking member 38 is positioned within the slot 36, the door 30 cannot be removed from its position over the key pad 14.

The second locking assembly 28 essentially comprises a pivotally attached side door 42 having a pair of electrical cord receiving slots 44, 46. Electrical cords 48, 50 associated with televisions, VCR's, etc. are respectively connected to the receptacles 18, 20, and the cords are respectively positioned within the slots 44, 46 as best shown in FIG. 1. Additionally, a pivotal door 42 further includes a slot 52 which is directable through a horizontal opening 54 formed in the housing 12, and this slot 52 is designed to receive the locking arm 32. More specifically, the pivotal door 42 must be closed over the electrical cords 48, 50 prior to a closing of the door 30, whereby the locking arm 32 may be slidably positioned within the slot 52 upon a closing of the door 30. The locking member 38 may then be rotated into position within the slot 36 to prevent the opening of either of the doors 42, 30.

The design of the programmable timer 10 is almost limitless. For example, the timer could consist of a seven day programmable timer, and could either mechanically or electronically allow only a certain number of television programs to be played each day. While the plug locking arm assembly 28 prevents unplugging of the electrical cords 48, 50, it is not necessary that both of the electrical receptacles be built into the timer whereby a VCR or the like could still be programmed even though the television set is not on. The purpose of the circuit breaker reset button is to prevent kids from tampering with the preset time since parents or others would have to open the door 30 to reset the breaker. The door 30 could be constructed of a transparent plastic so that the liquid crystal display could be viewed to determine the programming sequence. The unit is designed with a backup battery so if a loss of external power is experienced, the preset programming would be saved even though the timer doesn't work.

Figure 11:
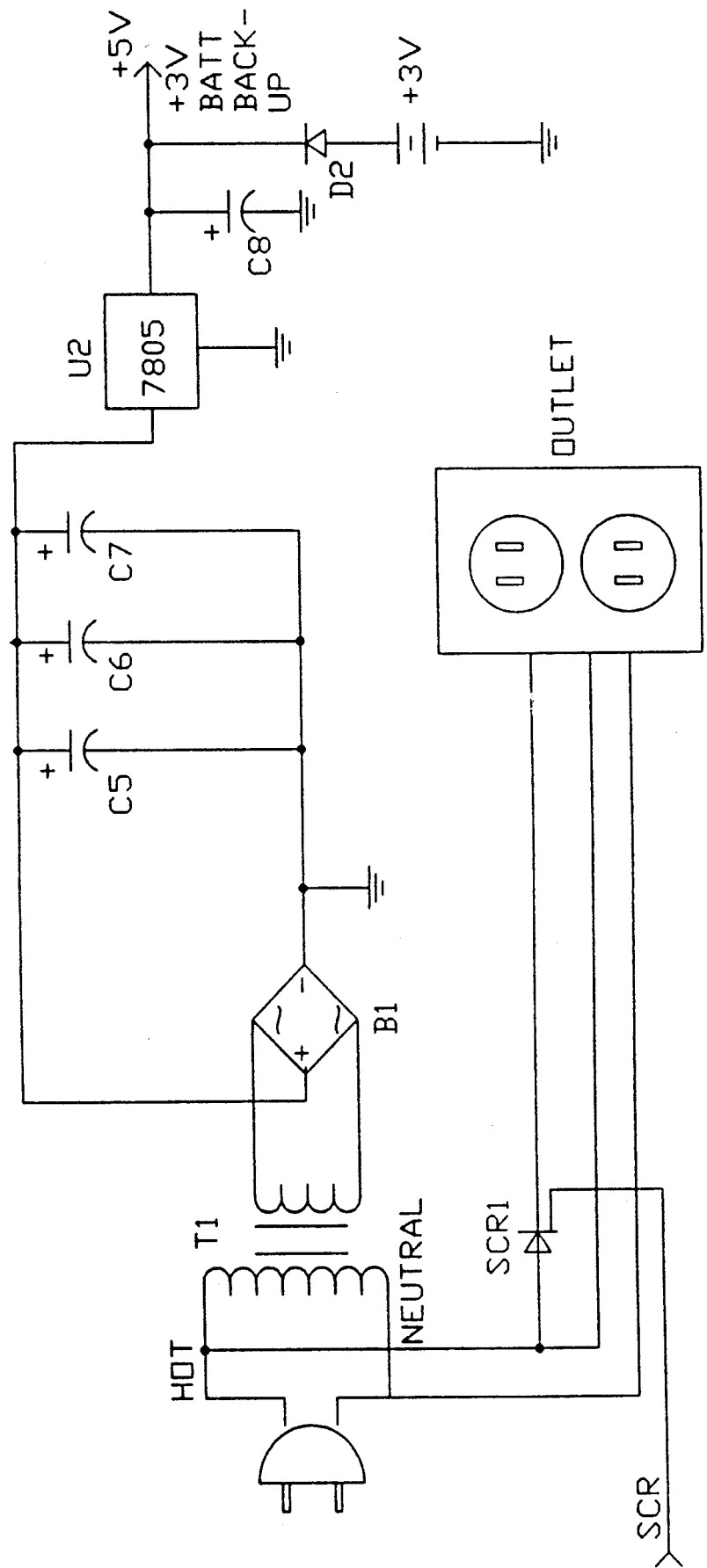
FIG. 11 is an electrical schematic of the power supply circuit forming a part of the present invention.
Figure 12:
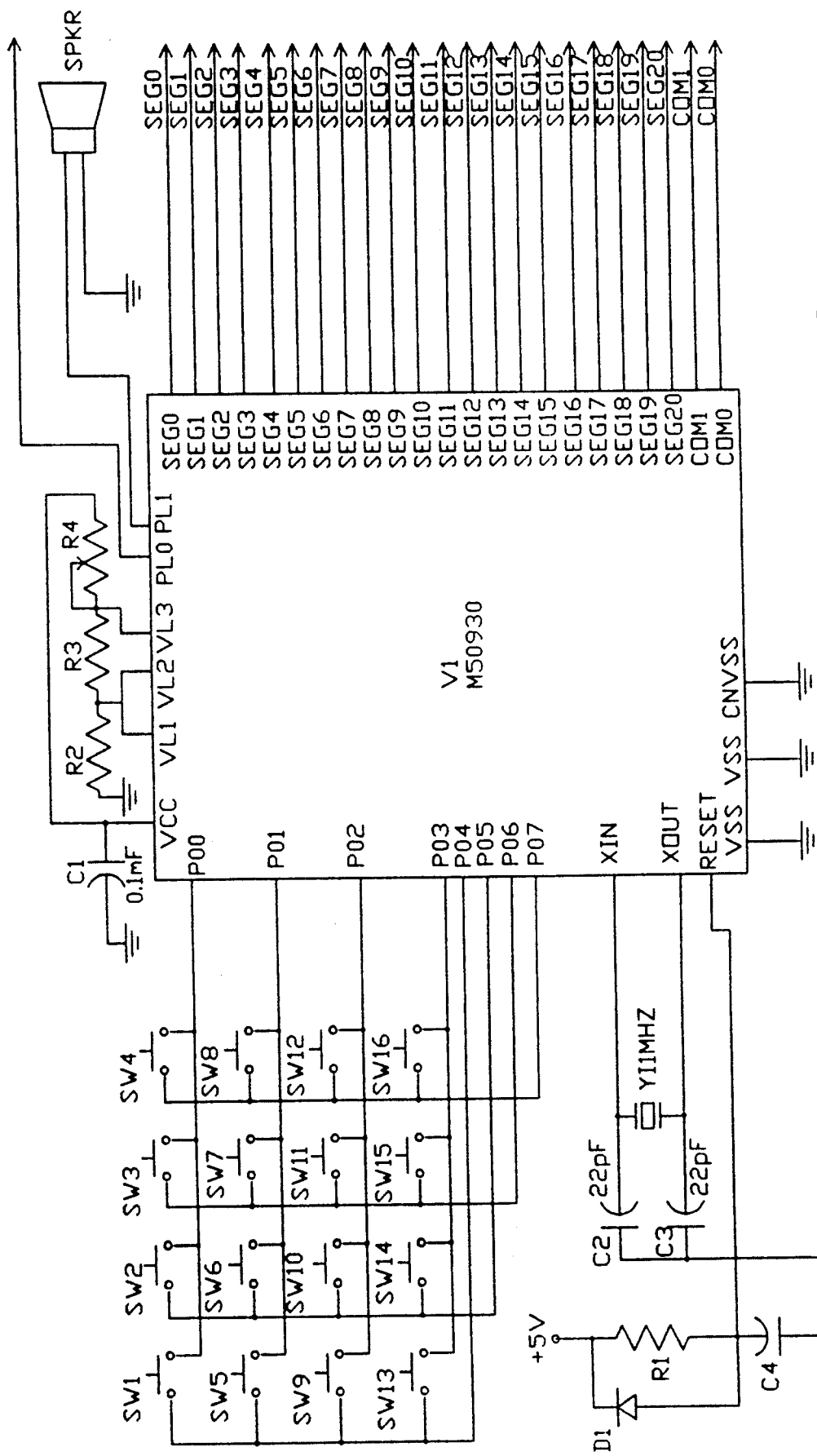
FIG. 12 is an electrical schematic of the switching circuit forming a part/of the present invention.
Figure 13:
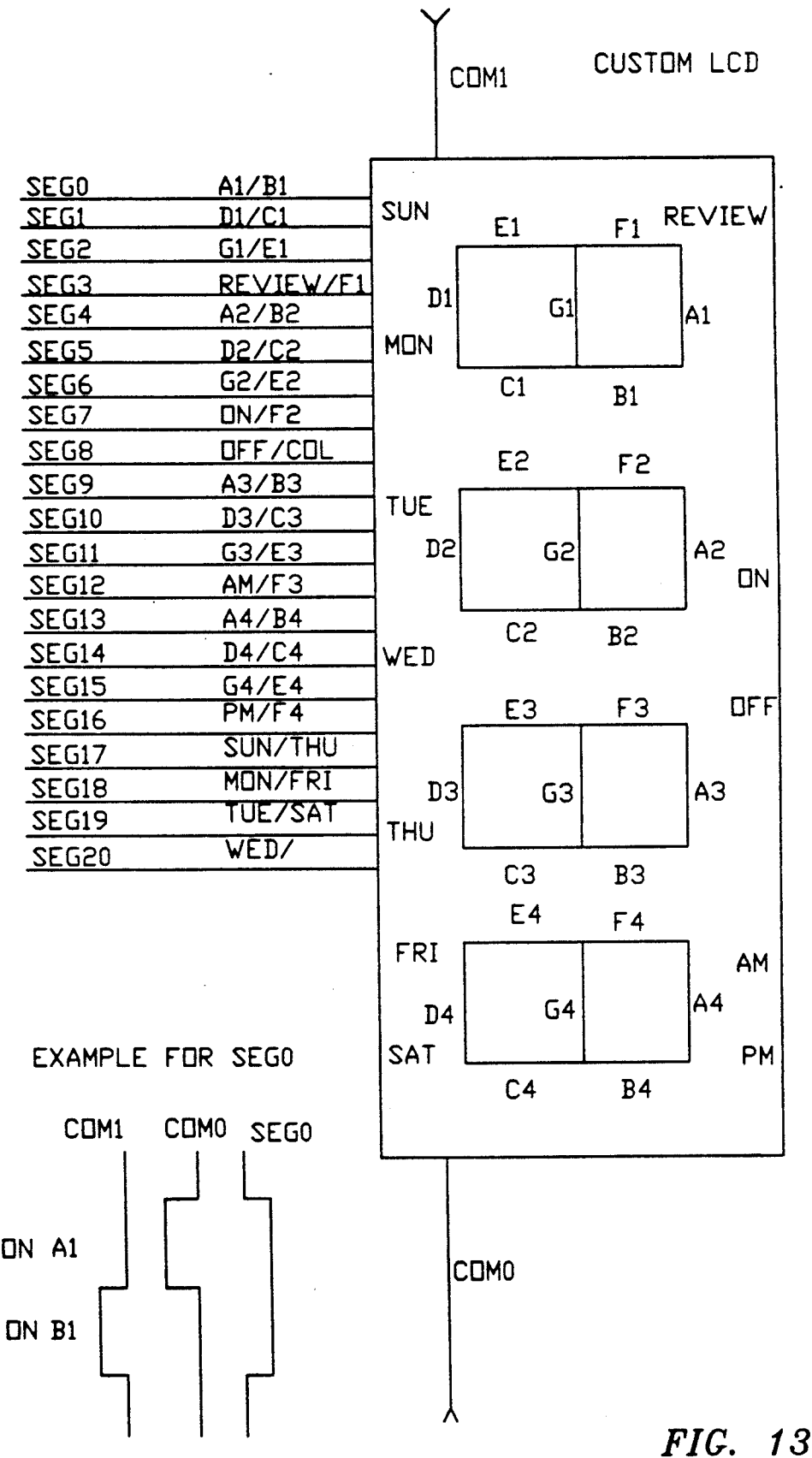
FIG. 13 is an electrical schematic of the liquid crystal display (LCD) circuit forming a part of the present invention.

FIGS. 11-13 have been provided for the purpose of illustrating one workable electronic configuration which could be employed in the construction of the present invention 10. In this respect, a conventional power supply circuit is illustrated in FIG. 11. Similarly, an electronic switching circuit associated with the key pad 14 is illustrated in FIG. 12, and a conventional operable liquid crystal display circuit is illustrated in FIG. 13. The circuits are of a conventional construction and no further discussion relative thereto will be provided.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved television viewing control unit comprising:
   housing means;
   timer means mounted in said housing means;
   power supply means operable controlled by said timer means; and
   programming means for operably controlling said timer means,
   wherein said programming means includes a key pad for operably inputting electrical instructions into said timer means,
   and further including first and second security means for preventing access to said key pad,
   wherein said first security means comprises a door pivotally attached to said housing means, said door being pivotally positionable over said key pad,
   further including locking means for locking said door when positioned over said key pad, and
   wherein said second security means comprises means for selectively securing electrical power supply cords to said housing means, and
   wherein said second security means comprises a second door pivotally attached to said housing means, said second door being pivotally positionable over electrical receptacles formed in said housing means to prevent access thereto, said second security means adapted to be locked in place by said locking means.

* * * * *